Patented Apr. 30, 1935

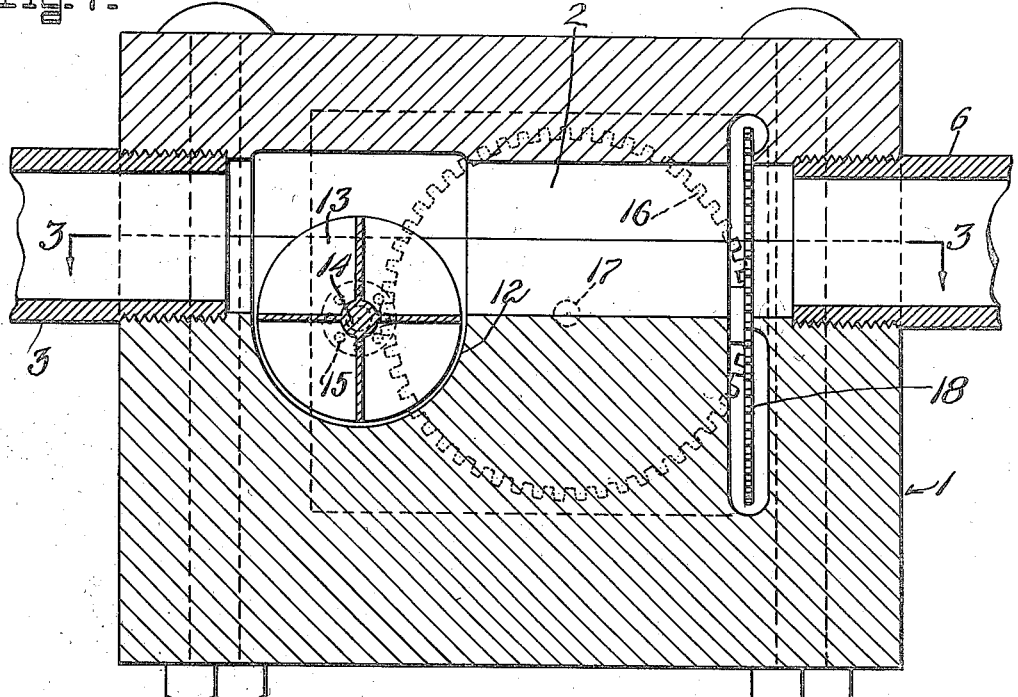
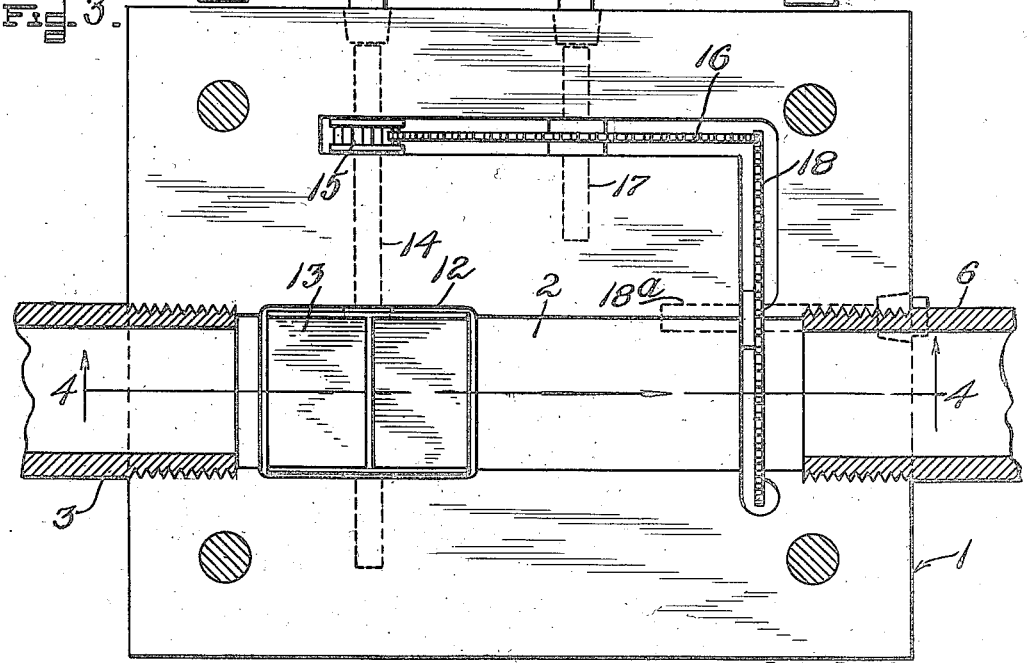

1,999,804

UNITED STATES PATENT OFFICE 1,999,804

IRRIGATION APPARATUS

Alexander E. De Loria, Westwood, Mass.

Application August 13, 1930, Serial No. 474,970

1 Claim. (Cl. 137—146)

My invention relates to irrigation apparatus and it has for its object to provide an improved apparatus of this class which will operate automatically to vary the supply of water to the distributing nozzles or other outlets from a predetermined maximum to a predetermined minimum so as to vary the trajectory of the stream that is projected from each nozzle or outlet, and in this way cause the apparatus to water or irrigate a much greater area of the ground than is possible when a constant supply of water is delivered to the nozzles or outlets.

To these ends I have provided an apparatus of the character described including a valve mechanism that is operated by the water as it flows through the same from the supply to the distributing outlets so as to vary the supply of water to said outlet and thereby vary the trajectory of the stream issuing from the latter.

In the accompanying drawings:

Figure 3 is a section on line 3—3 of Figures 1 and 4.

Figure 4 is a section on line 4—4 of Figure 3.

Figure 1:
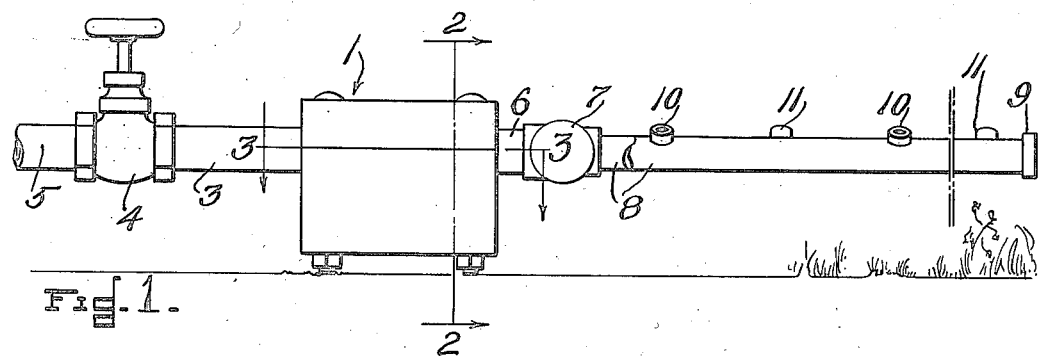
Figure 1 is a side elevation of a portion of an irrigation apparatus constructed in accordance with my invention.

Having reference to the drawings 1 represents the body of my new valve mechanism, said body being formed with a port or water-way 2 therethrough, the inlet end of said water-way 2 being connected by a pipe 3 with the outlet of a shut-off valve 4 whose inlet is connected by a pipe 5 with a supply of water under head or pressure.

The outlet end of the water-way 2 is connected by a nipple 6 with a manifold 7 provided with a plurality of horizontally disposed distributing branch pipes 8, each of which is closed at its outer end by a cap 9.

At intervals throughout its length each distributing branch pipe 8 is provided with obliquely disposed delivery nozzles 10 and 11. The nozzles 10 and 11 extend upwardly and outwardly from their pipe 8, the nozzles 10 being arranged in a row at one side of the pipe and the nozzles 11 being arranged in a row at the opposite side of said pipe. Preferably the nozzles 10 and 11 are spaced uniformly throughout the length of the distributing pipe 8 with the nozzles of one row staggered relatively to the nozzles of the row that is upon the opposite side of the pipe.

The body 1 of the valve mechanism is formed with a chamber 12 that opens into the water-way 2 and within this chamber is a turbine wheel 13 fast on a shaft 14 journaled in bearings provided in the body 1. This shaft 14 carries a pinion 15 which drives a relatively large gear 16 rotatably supported by a shaft 17 that is also journaled in bearings in the body 1. The gear 16 meshes with, and drives, a second large valve-gear or wheel 18 constructed with a web that is formed with two relatively large diametrically opposite ports 19 and two pairs of intermediate relatively small ports 20.

Figure 2:
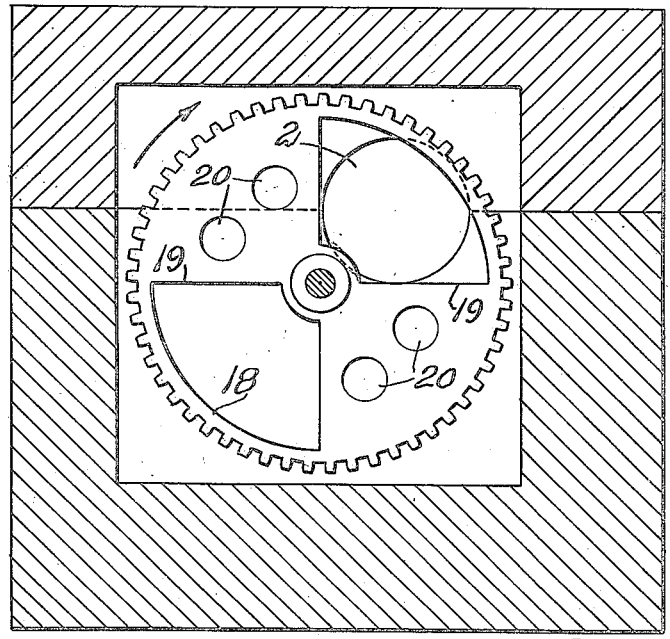
Figure 2 is a section on line 2—2 of Figure 1.

The valve-gear 18 extends across the water-way 2 and when the apparatus is in use it is slowly rotated in the direction of the arrow, Fig. 2, by the turbine wheel 13 acting through pinion 15 and gear 16, said turbine wheel being driven by the flow of water through the water-way 2.

During the rotation of the valve-gear 18 the ports 19 and 20 are successively and alternately brought into register with the water-way 2, and it will be clear that when one of the ports 19 is in full register with said water-way, then the maximum supply of water is delivered to the distributing pipes 8. Also, it will be clear that when either pair of ports 20 is in register with the water-way 2 then the minimum amount of water is delivered to said distributing pipes 8.

Figure 5:
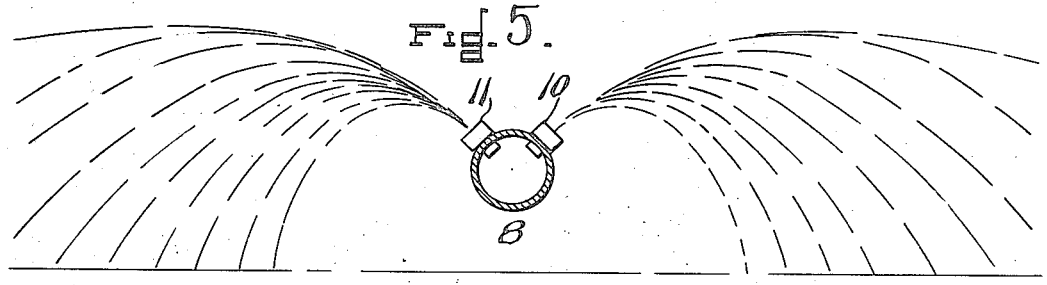
Figure 5 is a diagrammatic view illustrating the manner in which the water is distributed by my new apparatus.

The increase and diminution of the supply of water to the distributing pipes 8 occasioned by the rotation of valve-gear 18 is approximately uniformly progressive and hence the trajectory of the stream of water issuing from each nozzle 10 or 11 is varied after the fashion illustrated in Fig. 5. That is, when the maximum amount of water is being supplied to the distributing pipes, said trajectory will be of the greatest length and when the minimum amount of water is being supplied to said pipes the trajectory will be the shortest. Thus the water is distributed much the same as if each distributing pipe 8 was oscillated on its axis to a predetermined extent as has heretofore been the case.

In apparatus as heretofore provided wherein the distributing pipe was oscillated on its axis to a predetermined extent as described it was necessary to provide auxiliary power by which to effect the oscillation of the pipe. With my improved apparatus, however, the mechanism which varies the trajectory of the water is operated automatically by the water flowing through the water-way 2 thus dispensing with the use of auxiliary power as well as with mechanism for oscillating the delivery pipes.

What I claim is:

An irrigation apparatus having, in combination, a distributing conduit; a conduit for supplying water under pressure to said distributing conduit, and valve mechanism between and connecting said two conduits for automatically varying the rate of flow of water from said supply conduit to said distributing conduit without stopping said flow, said valve mechanism comprising a body having a port extending therethrough whereof one end is connected with the supply conduit and the opposite end with said distributing conduit, a valve wheel rotatably mounted within said body alongside of said port so that said valve wheel extends across and controls the latter, said valve wheel being formed with a circular series of ports of different sizes which are successively brought into register with the port of said body when said wheel is rotated thereby to vary the flow of water through said body without stopping said flow, a turbine rotor mounted within said body and continuously operated by the water flowing through the latter, and gearing through which said rotor acts to continuously rotate said valve wheel.

ALEXANDER E. DE LORIA.